April 5, 1960 E. F. MOORMAN ET AL 2,931,219
PROCESS OF DETERMINING THE DEPOSIT CHARACTERISTICS
OF ANTIFREEZE SOLUTIONS
Filed May 22, 1957
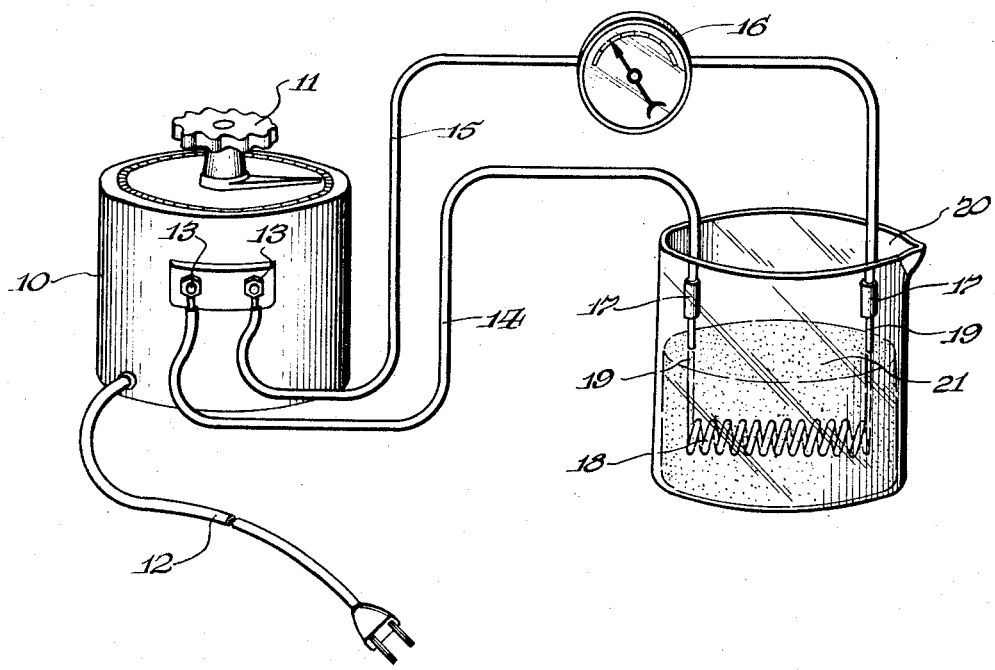
Inventors
Earl F. Moorman
Joe Valence
Paul O. Pippel
Attorney

2,931,219

PROCESS OF DETERMINING THE DEPOSIT CHARACTERISTICS OF ANTIFREEZE SOLUTIONS

Earl F. Moorman, Elmhurst, and Joe Valence, Chicago, Ill., assignors to International Harvester Company, Chicago, Ill., a corporation of New Jersey Application May 22, 1957, Serial No. 660,811

3 Claims. (Cl. 73—53)

This invention relates to a process for determining the deposit characateristics of a solution. More specifically, the invention has to do with an improved method of testing antifreezes in order to determine the deposit characteristics of such solutions.

Antifreezes such as mono- or poly-hydric alcohols, are generally inhibited against corrosion, foaming, creeping, etc. by the addition of miscellaneous inorganic and organic materials. When these antifreezes are used as engine coolants, it has been found that in some instances, the inorganic and organic materials separate from the solution and form a heat-insulating film or deposit in certain locations in the engine cooling system. In other words, the engine while under certain operating conditions reaches a sufficiently high temperature wherein certain materials found in the antifreeze form a deposit along certain critical portions of the engine which results in localized "hot spots." If these so-called "hot spots" are in areas of high stress location there is a great likelihood that the engine head will crack at these particular points, thus causing engine failure. It is extremely desirable, therefore, to provide a simple process which can be quickly applied to different types of antifreeze solutions in order to determine the deposit tendencies or characteristics of any particular type of antifreeze. It is a prime object of this invention, therefore, to provide such an improved process.

A still further object is to provide an inexpensive, effective, simple and accurate process for determining the deposit characteristics of a solution such as an antifreeze whereby an antifreeze having low deposit characteristics can be chosen for use in an engine which operates at high temperatures.

These and other objects of the invention will become more readily apparent from a reading of the specification when examined in connection with the accompanying sheet of drawing.

The drawing shows a perspective view of a device utilized in the process of determining the deposit characteristics of an antifreeze.

In the drawing, the reference character 10 designates a 110 volt variable transformer having a suitable control means 11. An input electrical wire 12 may be connected to a suitable source of 110 volt electricity. The transformer 10 is provided with terminals 13 to which wires 14 and 15 are connected. The wire 15 is suitably connected to an ammeter 16 and both wires 14 and 15 are provided at their ends with sleeves 17. The wire coil 18 is provided with end portions 19 which are connected into the sleeves 17, the said wire coil 18 being immersed in a beaker 20 having an antifreeze solution 21 contained therein.

The wire coil 18 is made of a material known in the trade as "Nichrome" consisting generally of approximately 80% nickel and 20% chromium.

In order to determine the deposit characteristics of an antifreeze, the antifreeze may be placed in the beaker in clear solution or it may be suitably diluted to a 50% aqueous solution of antifreeze. A type of antifreeze tested with the process may consist of the following:

Ethylene glycol _____ milliliters__ 175.0
Diethylene glycol _____ do____ 45.0
Sodium tetraborate ($Na_2B_4O_7 10H_2O$) ___grams__ 5.4
2-mercaptobenzothiazole ($C_6H_4SC(SH):N$)_gram__ 0.225

Distilled water may be added to form the test solution.

In the test the following steps take place:

A 26-gauge wire, 80% nickel, 20% chromium, (Nichrome) is coiled around a rod having a diameter of approximately one-fourth inch. Eight or nine coil turns are made with an overall length of approximately one and one-half inches. The completed coil is then weighed on a suitable scale and it is then immersed in a beaker containing a 50% aqueous solution of antifreeze. The coil ends 19 are connected to the sleeves 17 and the cord 12 is plugged into a suitable source of electricity. The control 11 is set to pass an electric current of approximately 7.0 amperes through the coil for a period of ten minutes. The coil is then removed from the solution and excess antifreeze drops are removed by gently shaking the coil or by blotting the coil. While the coil is in the air, two amperes current are then passed through the coil. This will dry the solution remaining on the coil and the preferred drying time is one minute or less. The coil is then reweighed and any increase in weight over the original weight of the coil indicates the deposit formed on the coil and thus indicates the deposit tendencies of the antifreeze which has been tested. It has been found that this test is extremely accurate and is supported by field test conditions wherein the antifreeze has been placed under operating conditions. For instance, in the testing of one particular antifreeze by the present process the test indicated a deposit formation of 0.4 milligram. This is a low deposit indication and the accuracy of the test was substantiated in that the antifreeze did not during many hours of use result in the cracking of the cylinder head of an operating engine. On the other hand, the test, when applied to another antifreeze, showed a deposit of 10.6 milligrams and the resultant field test of the same antifreeze in an engine showed that the head cracked after 31 hours. The same test applied to clear water showed a deposit under 2.0 milligrams on the coil and during use of the same water in the engine over a long period of time no detrimental results were reported.

It is believed that the amperages used and the size and kind of resistance wire are only of importance insofar as they produce an adequate temperature in the wire. Obviously, the wire having a deposit may be dried in a manner other than the passage of an electric current. Temperatures measured by thermal expansion indicate that the wire when heated by 10 amperes, attains a substantially constant temperature of slightly over 300° F. within ten minutes using a satisfactory antifreeze, while an unsatisfactory antifreeze will show a continuous temperature rise which in some cases will exceed 1000° F. In other words, it is thus obvious that the coating or shielding of the wire by the undesirable deposits causes a constant increase in the temperature of the wire, the same result occurring in an engine head with resultant cracking failures.

The method of deposit formation is believed to be as follows:

If an antifreeze, for instance, is initially inhibited with a material such as magnesium orthoborate or tetraborate, either of which salt is water soluble, it is believed that such a salt upon contact with hot metal transforms to magnesium metaborate which is almost water insoluble. This insoluble deposit formed becomes a heat barrier on the metal on which it is deposited, allowing the temperature of the deposit and the metal to rise to a higher temperature, constantly forming more insoluble deposits and resulting in increased heat barriers. This continues until equilibrium is finally established at some quite high temperature. In engine heads such high temperatures will produce head cracking.

With the utilization of the above process antifreezes can be quickly tested to determine their desirability in engines which are subjected to high temperatures. Such a test can be readily made by any person in or without the laboratory. Defective antifreezes can thus be quickly set aside.

Thus it is obvious that an improved process for testing the deposit characteristics of an antifreeze has been disclosed and it must be understood that changes and variations in the process may be made without departing from the spirit of the invention as disclosed or the scope thereof as defined in the appended claims.

What is claimed is:

1. A process of determining the deposit forming characteristics of a liquid comprising the steps of weighing a wire coil, immersing said coil in a container containing a liquid, passing an electric current at approximately 7.0 amperes through said coil for a period of approximately ten minutes, removing the coil from the liquid and removing excess liquid drops therefrom, drying the coil by passing a current of approximately 2 amperes therethrough for a time interval up to one minute, and reweighing the coil with any weight increase indicating the amount of deposit on said coil.

2. A process of determining the deposit forming characteristics of a solution comprising weighing a wire, immersing said wire in a solution, passing an electric current of a predetermined amperage through said wire for a predetermined time period, removing the wire from the solution, drying said wire with solution thereon by passing a low amperage electric current therethrough, and reweighing said wire with any weight increase indicating the amount of deposit on said wire.

3. A process of determining the deposit forming characteristics of a solution comprising weighing a wire, immersing said wire in a solution, passing an electric current of a predetermined amperage through said wire for a predetermined time period, removing the wire from the solution, drying said wire with solution thereon, and reweighing said wire with any weight increase indicating the amount of deposit on said wire.

References Cited in the file of this patent

UNITED STATES PATENTS

| | | |
|---|---|---|
| 2,317,950 | Burk et al. | Apr. 27, 1943 |
| 2,619,408 | Mengel | Nov. 25, 1952 |
| 2,669,865 | Cole et al. | Feb. 23, 1954 |